Patented Apr. 17, 1945

2,373,699

UNITED STATES PATENT OFFICE 2,373,699

LOW TEMPERATURE RESISTANT RESIN COMPOSITION AND METHOD FOR MAKING SAME

Addeline J. McGillicuddy, Spokane, Wash., assignor of one-half to G. A. Kjosness, Spokane, Wash., and one-fifth to Bennett H. Levenson, Washington, D. C.

No Drawing. Application August 21, 1941, Serial No. 407,821

4 Claims. (Cl. 260—36)

This invention relates to the art of plastic resinous compositions. More particularly it pertains to resins of synthetic origin, embracing among its features novelty of product and method of preparing the same.

The potentialities of "plastics" or synthetic resinous materials with respect to new adaptations and modifications are generally conceded to be of substantially unlimited extent. In this connection, a vast amount of investigational work has been performed for the purpose of obviating the dependency of this country on natural materials with respect to which it is not self-sufficient, such as rubber. Synthetic resins have been and continue to be a focal point of research interest for their novel inherent attributes as well as for substitute or replacement materials.

Resinous compositions that are now subject to quantity production and manifold usage are the polyvinyl resin type materials, illustrated by polymerized vinyl chlorides, and polymerizate mixtures containing the same, such as the copolymers of vinyl chloride and vinyl acetate.

Articles produced from these resins occur in assorted physical forms, such as molds, extruded products, films and sheets. Such articles reveal diversified properties ranging from substantial rigidity to rubber-like flexibility, the prevailing characteristics being determined by a number of factors in addition to the fundamental substances or reactants involved in the polymerized composition. Among the more important of such factors are the type and quantity of plasticizers utilized. For example the flexibility, resiliency and general rubber-like properties of sheet or film material comprising a vinyl chloride-vinyl acetate copolymer, such as has been available under the name of "Vinylite" Series "V" resins, is now known to be attributable in substantial degree to the softening effect of the comparatively large plasticizer content.

Notwithstanding the plasticizer content in polyvinyl resin type products, they are known to manifest a tendency toward brittleness and/or cracking, which is especially apparent in the case of articles made from compositions containing polymerized vinyl halides. Illustrative of the halide resins particularly susceptible to this objectional tendency are the polyvinyl chlorides, the copolymer of vinyl chloride and vinyl acetate, and other polymerizates or polymerizate mixtures containing polyvinyl chloride, such as the mixed polymerizate of polyvinyl chloride and acrylic acid esters. In the further consideration given hereinbelow to this type of substances, they may be generically referred to as polyvinyl chloride containing resins.

This propensity to brittleness or cracking is more apparent as the freezing temperature is approached and becomes aggravated with a temperature decrease to values substantially below 0° C. or 32° F. It is applicable even in the case of the highly plasticized polyvinyl resins such as the normally resilient, flexible, rubber-like sheets or films above referred to, becoming particularly noticeable at low temperatures by diminution in plasticity, resiliency and the like; with progressively lower temperatures, the pliability and resiliency merges into a perceptible stiffness and at temperatures approximating that of dry ice, —110° F., the formerly resilient rubber-like sheet or film may be fractured or shattered through impact or shock.

Attempts to obviate the brittleness and/or cracking tendency of polyvinyl resins have been based upon the treatment of the dry or substantially polymerized material as distinguished from the plasticized article. Instead of calendering the polymerized resinous composition in the presence of a solvent or plasticizing agent, the dry material has been subjected to rolling, as into the form of a thin sheet, while stretching the sheet in the direction of the rolling operation. Under such conditions of treatment, polymerized vinyl chloride type resins have allegedly shown a substantial brittleness reduction, in a direction at right angles to that in which the stretch was applied. By resorting to a dual stretch treatment through the application of tension to the sheet being formed, both in the direction of rolling operation and at right angles thereto, in the presence of heat, the aforesaid brittleness has, according to assertions, been reduced in all directions.

It has further been suggested in connection with this tensioning or stretching treatment that the addition during the rolling operation to the dry polymerizates in their hot plastic state of small quantities of substances, characterized as emulsifying agents or low molecular weight lubricants under normal conditions functioning in the nature of lubricants, adhesives or binding agents, will increase the strength of the thin sheets or foils produced; this is in the nature of a slight plasticization during the tensioning treatment. Included among such emulsifying or lubricating type materials are mentioned various alcohols of the mono and polyhydric type illustrated by octadecyl alcohol, stearyl alcohol, oleyl alcohol, wool fat alcohol, glycerine, and glycerine ether alcohol; other designated types of materials include the fatty acid amides and amide esters exemplified by stearic acid ethanol amide and stearic acid ethanol ester. The indications are that while quantities approximating 1% of the polymerizate will provide reduction in brittleness proportions, up to 5–10% of the polymerizate will actually increase the brittleness of the product.

As above stated, the degree of rigidity, flexibility and resiliency in articles formed from polymerized resins is materially influenced by the proportion and character of the plasticizing agent, which in accordance with the usual practice is supplied during the calendering treatment—the greater the plasticizer content, the more flexible and pliable the product. To provide desirable softness, oils are utilized in the calendering treatment as plasticizing agents. Notwithstanding the inclusion of such plasticizing or softening agents, the tendency toward brittleness and cracking has been revealed as an inherent property of articles made from plasticized polymerized vinyl resins, especially of the polyvinyl chloride type.

It is an object of this invention to obviate the undesirable characteristics in resinous compositions hereinabove described.

An additional object is to obtain a synthetic plastic composition which retains its normal properties and characteristics at substantially low temperatures.

Another object is the obtention of articles formed from polymerized vinyl resins in which their normal degree of resiliency or flexibility is substantially unaffected by temperatures materially below freezing.

A further object of the invention is to attain rubber-like plasticized resinous compositions of the polyvinyl chloride type which are substantially devoid of brittleness and cracking tendencies at low temperatures.

Another object is to produce films or sheets from the plasticized copolymerizate of vinyl chloride and vinyl acetate which retain their resiliency, flexibility and elasticity at temperatures as low as approximately $-110°$ F.

An important object is to devise novel methods for producing plasticized resinous compositions, especially of the polyvinyl chloride type having the above described attributes.

Other objects, advantages, and features of my invention will become apparent from the following description which is to be treated as illustrative and not limitative.

Within the scope of my invention, it has been found that such tendency toward a change from the initial brittleness or cracking properties of resinous materials can be obviated by appropriate treatment of the polymerizate with a suitable substance. Thus, by way of illustration it has been determined that polymerized and plasticized polyvinyl resins may be effectively treated with a reagent of the type above designated as "lubricants" to substantially remove any inclination toward cracking or brittleness, as a result of temperature decrease for example, and to minimize the prevailing or inherent brittleness of the resin product.

Preferably the "so-called lubricant" reagents should be essentially inert to the resin and not have any substantial superficial effect, such as a solvent or chemical reaction thereon; however, some such effect in small degree will not necessarily preclude a reagent from the scope of this invention.

Substances that have in general been found to function effectively comprise animal and vegetable oils and fats or esters, such substances being desirably relatively inert toward the resinous composition; included within this contemplation are compatible mixtures of such substances. While these lubricant reagents may be in liquid or solid state, the former is preferred especially from the standpoint of facility in treatment. Desirably the oil should be of the non-drying variety although semi-drying oils may provide beneficial results. Illustrative of animal and vegetable oils and esters which have been shown to be within the purview of the invention are neat's foot oil, olive oil, castor oil, fatty acid glycerides, inclusive of glyceride mixtures exemplified by "Crisco," lard, etc.

Also operative within the purview of the invention are chemical substances exemplified by alcohols of the mono and polyhydric type, such as ethyl alcohol and glycerine, although these substances may not be quite as effective or satisfactory as the oils or esters of the type above indicated. For example, tests performed on the copolymer of vinyl chloride and vinyl acetate in flexible sheet form with ethyl alcohol reveal an improved resistance to cracking, but the inherent flexibility of the sheet was not benefited. As for glycerine, it likewise improved the resistance to cracking tendency at low temperatures and had no apparent detrimental effect on resiliency or flexibility; however a tendency to develop turbidity in the resin was revealed.

A preferred embodiment of the invention is predicated upon the use of mineral oils, desirably such as are essentially free from paraffin or asphaltic residues. Particularly optimum results are obtained from the use of refined, high-boiling distillates which satisfy the conventional designation or interpretation given to "liquid petrolatum" or "mineral oil," this substance being free from paraffin content or at least does not yield paraffin.

The procedural embodiment of the invention is based upon the surface contact or exposure of the resin to the lubricant reagent utilized. While it is not intended to be restricted to any theory of operation, it is believed that some form of association, possibly in the nature of an impregnation phenomenon may take place between the reagent and the resinous composition, even though the latter has been plasticized.

Optimum conditions of operation are considered to be at temperatures in excess of normal or average values prevailing at atmospheric conditions. Especially adaptable and extremely suitable results have been attained by heating the polymerized and plasticized resinous composition to the point of substantially incipient softening, although for most expedient operation the temperature should not attain a degree at which the material alters its structural character. Subsequent to this heating treatment, the composition is advantageously inserted in a bath of suitable lubricant reagent which may be at normal atmospheric temperature. The time for such treatment is subject to variation within the skill of the operator, and should be sufficient to permit of a reasonable contact in order to attain a desired effect upon the characteristics of the resin. As previously indicated, this treatment is believed to be at least in part dependent upon the impregnation of the finished resinous material by the reagent, said impregnation depending upon the inherent characteristics of the resin composition as well as presumably upon prevailing temperature and pressure conditions.

By way of an example, illustrative both with respect to resin and reagent, which has afforded entirely satisfactory results in obviating the cracking and brittleness tendency of polyvinyl chloride type resins, even at extremely low temperatures, and has improved the inherent resiliency and flexibility, while in no manner affecting the desirable properties of transparency or translucency, the following is set forth. The plasticized copolymerizate of vinyl chloride and vinyl acetate available in film or sheet form and impressively analogous to sheet or film rubber with respect to resiliency and general properties, is the subject example; this resin composition is available in transparent as well as semi-transparent or translucent form under the trade designation of "Vinylite" "V."

In accordance with the preferred procedural embodiment, this "Vinylite" is subjected to a heat treatment below that which will affect its physical characteristics or shape, but nevertheless of material degree, i. e. approximately 230° F.–240° F. The time of heat treatment will vary with the prevailing circumstances, such as the character of the resin and the rate at which it is brought to maximum temperature. In the case of sheet "Vinylite" "V" heated to approximately 230° F.–240° F., a half-hour of such treatment is quite satisfactory.

Upon completion of the heating step, the resinous material is immersed in a bath of so-called "liquid petrolatum" at atmospheric temperature. The time of such immersion may be varied between wide limits, from a few minutes to several hours where atmospheric cooling in the bath is permitted. An expedient time is approximately thirty minutes although this is subject to variation within the skill of the operator.

Upon completion of this primary immersion in the liquid petrolatum the "Vinylite" is removed therefrom and desirably surface cleaned of all superficial oil. The product thus attained manifests the improved attributes relative to resiliency or "softness" and resistance to cracking and brittleness, even at temperatures as low as approximately $-110°$ F., corresponding with the temperature of solid $CO_2$.

However to effectively control the oil content believed to result from impregnation, it has been found desirable to subject the "Vinylite" to a second heat treatment along the lines of the first and following generally the same range of temperature conditions and time interval. Upon removal from the heating zone, the presence of superficial oil is again apparent, and it is merely necessary to again resort to the aforementioned cleaning step to wipe the material dry of any surface signs of liquid. It is believed that this second heating treatment, which may be referred to as the tempering step, functions in the capacity of a quantitative reagent control, thereby obviating the inclusion of excessive quantities of mineral oil, for example, within the resinous composition.

Upon completion of this second cleaning step, the resin may be permitted to cool down to normal atmospheric conditions, and manifests the above referred to improved properties. In lieu of such gradual cooling however, the treated "Vinylite" may be subjected to extremely low temperatures as by direct contact with solid carbon dioxide which is at approximately $-110°$ F. This frigid contact may follow promptly upon the second cleaning step and while the "Vinylite" is still of substantial temperature. After a material time interval of exposure to this low temperature—for as much as six hours—the "Vinylite" is removed from the low temperature zone of treatment.

Despite the temperature of the $CO_2$ and time of exposure thereto, the sheet or film of "Vinylite" manifests no inclination to brittleness or cracking, and retains all of its normal characteristics of elasticity, resiliency, translucency, etc. It is permitted to return to atmospheric temperature conditions by normal exposure to the atmosphere.

While as previously indicated this cold temperature treatment is not a prerequisite to the obtention of the product having the desired properties, and serves primarily as an expedient test of the material, it is believed to actually improve the non-cracking and non-brittleness characteristics of the product at substantially low temperatures.

It has moreover been found that when sheets of material, treated in accordance with the present invention, are laminated, the improved results are embraced by the laminated product without sacrificing any of the prior art features obtainable from lamination. Similarly the inclusion of various perfecting ingredients during the course of preparing the resinous composition does not in any material manner affect the adaptability of the resin to treatment in accordance with the present invention.

It is apparent from the scope of the invention that the plastic composition attainable in accordance therewith makes possible the adaptation of polyvinyl resins and analogous materials to a wide field of usage under extreme temperature conditions not heretofore expedient.

While a preferred embodiment of treatment involves heating the resinous composition prior to immersion in the reagent bath at substantially atmospheric temperatures, this procedure is subject to substantial variation within the purview of the invention. Effective results may alternatively be attained through submerging the resin in a heated reagent, the temperature of the reagent being below that which will tend to distort the shape or physical characteristics of the material, such as its sheet form, resiliency, etc. Similarly the resin may be heated while immersed in the reagent.

Where treatment is with a reagent having the physical state of "Crisco," under normal atmospheric conditions, the heated resin may be coated with the fat or the resin may be heated in the presence thereof. It will be noted that the comparatively high temperature resorted to in heating the resin will fluidize the fat, and therefore, after a brief time interval, the treatment becomes equivalent to immersion in oil.

It should be noted that a distinct improvement in the characteristics of the polyvinyl resin may be attained even under substantial atmospheric conditions, but the time necessary to attain any material resistance to cracking will be substantially in excess of that required at higher temperatures. However, some definite improvement in the resin is attainable merely through the expedient of appropriate surface coating; thus sheet "Vinylite" which has had "mineral oil" rubbed on its surface and then wiped clean has manifested some element of resistance to cracking at low temperature, although by no means as effectively as that attained in accordance with optimum procedure hereinabove described.

Thus it is within the contemplation of the invention to treat the plastic composition with the reagent in any manner facilitating an expedient contact to attain the desired results, and such variations of procedure will be apparent to one versed in the art without departing from the invention herein.

While the exemplary procedure above set forth has been directed to the treatment of the flexible, rubber-like sheet form of the "Vinylite" copolymer of vinyl chloride and vinyl acetate, it is similarly applicable to other physical forms of the resin. The performance of tests, in accordance with the above description, on resinous articles, especially of the polyvinyl chloride containing type, manifesting considerable physical distinctions from the flexible sheet form produced similarly impressive improvement in reduction in brittleness and cracking tendency. These physical distinctions embraced varying degrees of reduced resiliency, flexibility, suppleness, etc., to the extent of comparative rigidity, and included plasticized articles formed in the different manners above indicated.

While I have directed my invention in accordance with the preferred embodiments of both composition and method, it is apparent that many variations and modifications both as to product and procedural details and steps may be made without departing from the scope of equivalents within the purview and spirit of this invention as defined in the following claims:

Having thus set forth my invention, I claim:

1. The method of substantially obviating the cracking tendency at temperatures substantially below freezing and reducing brittleness in a shaped article of plasticized polyvinyl chloride resin which comprises heating said resin, immersing the heated resin in a mineral oil substantially free from paraffin, removing said resin from the oil, freeing the resin from surface traces of oil, reheating the resin, again removing oil from the surface of said resin and subjecting the resin to a cooling treatment.

2. The method of substantially obviating the cracking tendency at temperatures substantially below freezing and reducing brittleness in a shaped article of a conjoint polymer of vinyl chloride and vinyl acetate resin which comprises heating said resin, immersing the heated resin in liquid petrolatum, removing said resin from the oil, freeing the resin from surface traces of oil, reheating the resin, and again removing oil from the surface of said resin.

3. The method of substantially obviating the cracking tendency at temperatures substantially below freezing and reducing brittleness in a shaped article of a rubber-like plasticizer conjoint polymer of vinyl chloride and vinyl acetate, which comprises immersing said article in liquid petrolatum while maintaining the temperature at the surface of the article at that of substantially incipient softening and below that which alters the structural character of the article, and removing superficial oil adhering to the surface of said article.

4. A shaped article of plasticized resinous composition prepared by the method of claim 3.

ADDELINE J. McGILLICUDDY.